Figure 1:
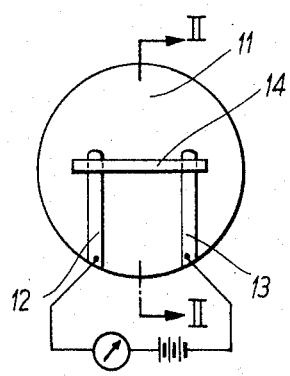

Dec. 6, 1960

M. MULLER 2,962,897

APPARATUS FOR MEASURING THE RELATIVE
HUMIDITY OF THE AIR

Filed June 8, 1959

2 Sheets-Sheet 1

Inventor
Max Muller
By
Watson, Cole, Grindle + Watson
Attys.

Dec. 6, 1960 M. MULLER 2,962,897
APPARATUS FOR MEASURING THE RELATIVE
HUMIDITY OF THE AIR
Filed June 8, 1959 2 Sheets-Sheet 2
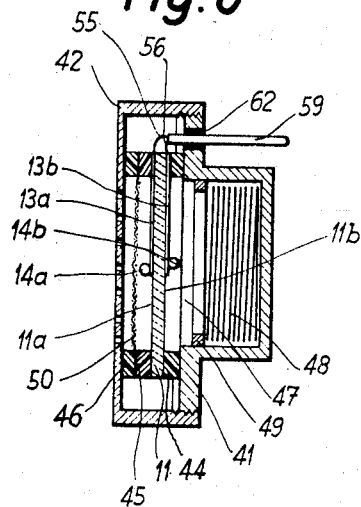
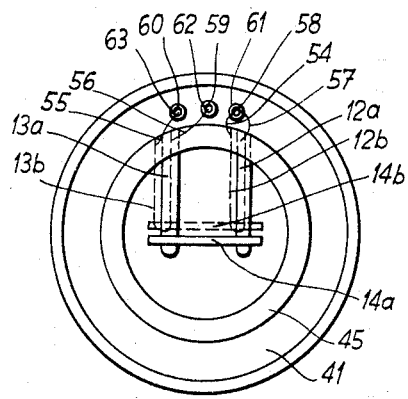
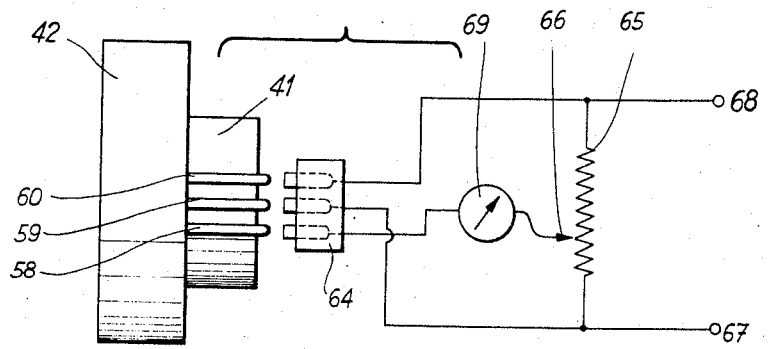
Inventor
Max Muller
By
Watson, Cole, Grindle & Watson
Attys.

United States Patent Office 2,962,897
Patented Dec. 6, 1960

2,962,897

APPARATUS FOR MEASURING THE RELATIVE HUMIDITY OF THE AIR

Max Muller, Obstgartenstrasse, Langnau am Albis, Switzerland

Filed June 8, 1959, Ser. No. 818,589

11 Claims. (Cl. 73—336.5)

This invention relates to apparatus for measuring the relative humidity of the air.

For measuring the relative humidity of the air, the electric conductivity of solutions of hygroscopic salts, as, lithium chloride is taken into consideration.

In principle, in hygrometers the salt solution is laid in thin layers between two metallic electrodes with the main difficulty to permanently retain the salt solution between such electrodes, that is to prevent any flow, as otherwise undesired resistance-variations would occur.

For attaining the object of the invention, the salt solution is mixed with gelatine or synthetic resins (as polyvinyl alcohol) thus thickening it (U.S. Patents Nos. 2,458,348; 2,285,421; 2,295,570 and 2,543,304). This however involves the drawback that the electric resistance of such layers changes up to 5 powers of ten or more, if the relative humidity changes by about 80%. Therefore commutatable measuring appliances having several measuring ranges or several measuring probes with different conductivities are necessary.

A much more favorable resistance-moisture characteristic is shown by hygrometers, whose salt solution has but very slight quantities of thicknening additions, or none at all. In such case, the conductivity changes by about 2 powers of ten when the air humidity varies by 80% relative humidity. In such hygrometers, the flow of the salt solution may be prevented by having a fibrous material impregnated therewith (U.S. Patent No. 2,047,638) or by having the salt solution mixed with an inert, insoluble filling powder, as quartz, barium sulfate, etc. in order to achieve a thickening thereof.

Unfortunately the methods referred to are objectionable in that for instance in a mixture of lithium chloride solution and powdered quartz, the conductivity is moreover affected by air bubbles which, with low humidity of the air, may be drawn into the mixture. This may lead to more or less severe afterworking and to hysteresis effects.

The object of the present invention is to avoid the various prior drawbacks, that is to retain the salt solution permanently in the same position between the two electrodes.

The invention relates to an apparatus serving for measuring the relative humidity of the air with two metallic electrodes which are on an insulating body and connected electrically in conducting relation to each other through a hygroscopic salt solution, the electric resistance between the electrodes being a measure of the humidity of the air.

It is therefore a further object of the invention to provide an apparatus characterized in that the insulation carrier has arranged thereon, a small rod of insulating material which connects the two electrodes to each other and has, at least at its side facing the insulation carrier, a convex cross-sectional shape for the formation of two substantially wedge-shaped spaces on both sides of the contact line between the rod and insulation carrier, so that the salt solution lodged in the two wedge-shaped spaces, is retained therein by capillary action.

Figure 2:
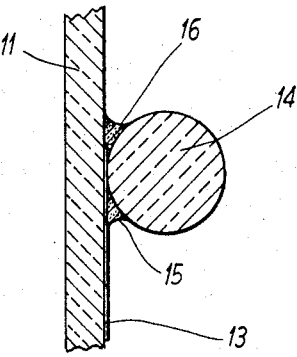
Figure 3:
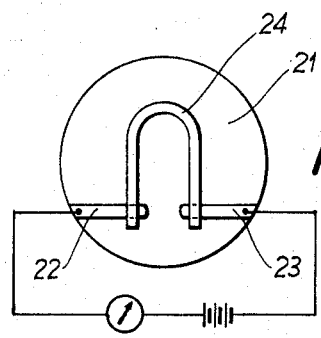
Figure 4:
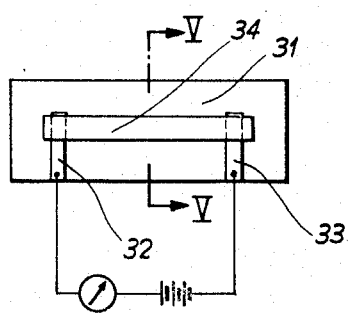
Figure 5:
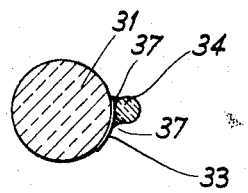

Further features and objects of the invention will appear from the following description and claims, taken in conjunction with the accompanying drawing in which:

Figure 1 is a front view of a first form of the hygrometer,

Figure 2 is a cross section taken on line 2—2 of Figure 1 in the direction of the arrows, the small rods being shown as greatly enlarged for clarity of illustration, Figure 3 is a front view of a modified form of the hygrometer, Figure 4 is a front view of another modified form of the hygrometer, Figure 5 is a cross section taken on line 5—5 of Figure 4, Figure 6 shows a sectional view of an apparatus for the practical measurements of the ambient air humidity and including a dust-filter and a temperature-compensating reference resistance, Figure 7 is a front view of the apparatus of Figure 6 with the cover and the dust filter removed, and Figure 8 is a side view of the apparatus of Figures 6 and 7, together with an electric wiring diagram of the measuring bridge.

The apparatus according to the invention is distinguished by a very high time-constant of its calibration and a very good reproducibility of the measuring results. It is free from afterworking and hysteresis effects. Also such hygrometers, in the case of series production, may easily be made with always the same resistance-humidity characteristics. Moreover, they require extremely small amounts of water (0.02–0.1 mg.) for response, thus will hardly vitiate the relative humidity, even with very small volumes of air, and this opens up new possibilities of application.

Referring to the form of embodiment of Figures 1 and 2, an insulating plate 11 of quartz, glass, synthetic material or other insulating substance, has two electrodes 12 and 13 of precious metal, preferably platinum or gold, applied thereto by evaporation in a high vacuum or by means of some other method. Placed across the two electrodes is a small rod 14 of quartz, glass, synthetic material or other insulating material. The rod 14 has a circular cross section and a diameter of between 0.03 to 0.30 mm., preferably 0.08 to 0.20 mm. The rod 14 together with the insulating plate 11 forms two wedge-shaped spaces 15 and 16, Fig. 2, which are located respectively on both sides of the contact line between the rod 14 and plate 11 and is filled with a salt solution to establish the conducting connection between the two electrodes 12 and 13. Filling the spaces 15 and 16 on the side of the rod 14 may be accomplished by touching one end of the rod with an extremely fine pointed camel's hair brush which has been dipped into the salt solution, whereby the same will swiftly pull itself along the rod to the other end thereof. Considering the size of the rod 14, this operation should preferably be effected under a microscope with low magnification or a magnifying glass. A lithium chloride or lithium bromide solution is preferably used as hygroscopic salt solution, either plain, or else with a slight addition of a thickening means, as for example polyvinyl alcohol, for increasing the steepness of the resistance-moisture characteristics. A solution of 10 g. lithium chloride and 1 g. polyvinyl alcohol in 100 g. water has proved quite suitable. After filling the two spaces on the side of the rod 14, it is of advantage to have the hygrometer aged artificially. To do this, it is alternately exposed to the air with 90% and 20% relative humidity for several hours at a temperature of 120° C.

In the embodiment according to Fig. 3, instead of a straight rod there is provided an inverted U-shaped rod 24 of quartz, glass or synthetic material. This rod 24 again connects the two electrodes 22 and 23 which are placed on the insulating base plate 21. Also in this case, the lateral spaces extending on both sides of the contact line between the rod 24 and base 21 are filled with a hygroscopic salt solution.

In the form according to Figures 4 and 5, instead of a plane insulating plate 11, there is provided a cylindrical rod 31 of insulating material. The rod 31 carries two electrodes 32 and 33 which are connected to each other by a small rod 34 of insulating material, whereby, also in this case, there is a hygroscopic salt solution 37 in the wedge-shaped capillary spaces on both sides of the contact line between the small rod 34 and insulating rod 31.

If the rods 14, 24 and 34 are not chosen as too thick, they will adhere so firmly to their base due to the adhesion of the electrolyte without further attachment, that they will not become displaced in their position by shocks occurring when using the apparatus, even if it is dropped.

In order to protect the hygroscopic salt solution from dust deposits which might affect the functional capacity of the hygrometer, a dust filter may be connected in series. For this purpose, colloid filter layers on a wire net carrier have been found suitable. Such filters can easily be made by immersing the wire nets for a short time in a solution of a high polymer, as nitrocellulose or a synthetic resin such as polymethacrylic acid methyl ester in glacial acetic acid or some other aqueous solvent, so as to fill the meshes of the net with the solution and subsequently to cause the high polymer to coagulate by dipping the net into water. For instance 6 g. polyacrylic acid methyl ester is dissolved in 100 ml. glacial acetic acid. In this solution, wire nets with 3600 meshes/cm.² are immersed, withdrawn and immediately placed into cold water. After adequate soaking, they are dried.

Such filters are tight even against aerosols, but on the other hand they permit air and water vapour to pass through. In contradistinction to foils of cellophane, polyvinyl alcohol, etc., which are likewise dustproof and readily permeable to water vapour, the described colloid filters store up practically no moisture, and this may be important for certain uses of the hygrometer.

For measuring the humidity with the described hygrometer, the electric resistance between the two electrodes is measured by means of a suitable appliance. When using a bridge connection, a suitable temperature-dependent resistance may be placed into the reference branch of the bridge, which largely compensates the influence of the temperature upon the conductivity of the hygroscopic salt solution. Thereby, as temperature-dependent resistance, avantageously a second hygroscopic salt solution is made use of, which corresponds to the first one and is an atmosphere of constant humidity. The first salt solution used as measuring probe, and the second salt solution used as reference resistance, may advantageously be provided on the same insulation carrier 11, 21 or 31.

Obviously, it is possible to use as reference resistance a suitable semi-conductor layer, which may also be provided direct on the insulation carrier of the humidity measuring probe.

The hygrometer comprises a metallic casing 41 having a perforated cover 42 screwed thereon. A plate 11, Figure 6, of an insulating material, as for example quartz, glass or synthetic material, is pressed by the cover 42, under interposition of two sealing rings 45 and 46, against a sealing ring 44 which is provided on the front of the casing 41. In this way a hermetically sealed space is formed therein. The sealing rings 44, 45 and 46 consist of an electrically well insulated elastically yielding material, as for example polyethylene. The cosed space 47 accommodates a plurality of small disks 48 of absorbent fibrous glass fabric which are held in place by a circular clip 49 within the casing 41. A dust filter 50 in front of the insulating plate 11 is clamped between the sealing rings 45 and 46, and it consists of a fine wire net which has been immersed in a solution of polymethacrylic acid methyl ester in glacial acetic acid, and then the synthetic resin is caused to coagulate between the meshes by immersing the net in water. After adequate soaking the net is dried.

The insulation plate 11 is the carrier for the moisture-sensitive part of the apparatus, an identical moisture-sensitive unit being provided both at the front and back of said plate. One moisture-sensitive unit at the front 11a of the insulating plate, facing the perforated cover 42, has the function of measuring the humidity of the air which passes from outside through the perforations of the cover 42 and then through the dust filter 50. Hereinafter, this moisture-senstitive unit is referred to as measuring unit. The other moisture-sensitive unit at the back 11b of the plate 11, adjacent the hermetically sealed space 47, has the function of serving as a connection means as a temperature dependent reference resistance, and in the following it is consequently called a reference unit.

Both the measuring unit and reference unit of the plate 11, include two precious metal electrodes 12a and 13a and 12b and 13b respectively, applied by evaporation. Each of these electrodes, in both the measuring and reference units, has placed thereacross, a thin small rod 14a and 14b respectively, made of an insulating material, as for example quartz, glass or synthetic material. Into the wedge-shaped spaces extending at both sides of the contact lines between the rods and plate 11, a hygroscopic salt solution is drawn in by capillary action. As salt solution, for example a solution of 10 g. lithium chloride and 1 g. polyvinyl alcohol in 100 ml. water is preferably used.

For the supply of current to the electrodes 12a and 13a and 12b and 13b, four wires 54, 55, 56 and 57 are clamped between the insulating plate 11 and sealing rings 44 and 45. Said wires are led to socket plugs 58, 59 and 60, whereby the electrodes 12a and 12b one each, of the measuring and reference units connected to the same socket plug 58, whereas the other two electrodes 13a and 13b are connected each to its own socket plug 59 and 60 respectively. The plugs 58, 59 and 60 are electrically insulated with a filling of resin and cemented in bores 61, 62 and 63 of the casing 41. According to Figure 8, a resistance measuring bridge may be connected to the plugs 58, 59 and 60 by means of a socket 64. Said measuring bridge comprises a potentiometer or resistance 65 with a tapping 66 and is connected to a source of A.C. current (not shown) by means of connections 67 and 68. The measuring instrument 69 indicates the balancing of the bridge. The measuring instrument 69 may have an electronic amplifier (not shown) associated therewith.

The glass fabric disks 48 in the hermetically sealed space 47 of the casing 41 are soaked with a hygroscopic salt solution, as for example lithium chloride solution and ensure constant humidity of the air in space 47. By suitable selection of the concentration of the lithium chloride solution, the humidity of the air in space 47 is adjusted in such a way that, with an average outside air humidity of, for instance 50%, acting upon the measuring unit at the front 11a of the insulating plate 11, the electric resistance of the reference unit becomes equal to that of the measuring unit. Consequently for this outside air humidity (50%) the measuring bridge will be in equilibrium, if the tapping 66 stands exactly in the middle of the potentiometer 65. This potentiometer may therefore be provided with a graduated scale, which is directly calibrated in percent of relative air humidity.

It is understood that various changes and modifications may be made in the embodiments illustrated and described without departing from the scope of the invention as defined in the appended claims.

I claim as my invention:

1. Apparatus for measuring the relative humidity of the air comprising an insulation carrier, a small rod of insulation material connected to the carrier, two metallic electrodes provided on the insulation carrier and connected in electrically conducting relationship to each other through a hygroscopic salt solution, the electric resistance between the electrodes forming a measure for the humidity of the air, said insulation carrier connecting said two electrodes to each other and having, at least at its side facing the insulation carrier, a convex cross-sectional shape forming two substantially wedge-shaped spaces on respective sides of the contact line between the rod and insulation carrier, said spaces having a salt solution lodged therein and retained therein by capillary action, and means to compensate for differences in temperature.

2. Apparatus according to claim 1, wherein the small rod is of circular cross-sectional configuration and has a diameter of between 0.03 and 0.3 mm.

3. Apparatus for measuring the relative humidity of the atmosphere comprising an insulating carrier plate, a rod of insulating material secured on the carrier plate, a pair of electrodes mounted on the carrier plate in spaced relationship, said rod being provided across the two electrodes, and said rod and the carrier plate forming two wedge-shaped spaces to be filled with a salt solution to establish the conducting connection between the two electrodes, and means to compensate for differences in temperature.

4. Apparatus according to claim 3, in which the carrier plate is composed of an insulating material selected from the group consisting of quartz, glass and a synthetic material.

5. Apparatus according to claim 3, in which the two electrodes are composed of a precious metal selected from the group consisting of platinum and gold.

6. Apparatus according to claim 3, in which the rod has a circular cross section with a diameter of 0.03 mm. to 0.30 mm.

7. Apparatus according to claim 3, in which the rod has a circular cross section with a diameter of 0.08 mm. to 0.20 mm.

8. Apparatus according to claim 3, in which the rod is straight.

9. Apparatus according to claim 3, in which the rod is U-shaped.

10. Apparatus according to claim 3, in which the carrier plate is in the form of a flat and round disc.

11. Apparatus according to claim 3, in which the carrier plate is in the form of a cylindrical rod.

References Cited in the file of this patent

UNITED STATES PATENTS

| | | |
|---|---|---|
| 2,381,299 | McCulloch | Aug. 7, 1945 |
| 2,510,018 | Gillingham | May 30, 1950 |
| 2,684,592 | Hadady | July 27, 1954 |
| 2,733,607 | Miller | Feb. 7, 1956 |